United States Patent
Kimura

(10) Patent No.: US 9,612,645 B2
(45) Date of Patent: Apr. 4, 2017

(54) INFORMATION PROCESSING APPARATUS, CONTROL METHOD FOR INFORMATION PROCESSING APPARATUS, AND STORAGE MEDIUM FOR REDUCING POWER CONSUMPTION IN RESPONSE TO A TRANSITION

(71) Applicant: CANON KABUSHIKI KAISHA, Tokyo (JP)

(72) Inventor: Tomohiro Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 235 days.

(21) Appl. No.: 14/311,103

(22) Filed: Jun. 20, 2014

(65) Prior Publication Data

US 2014/0380074 A1 Dec. 25, 2014

(30) Foreign Application Priority Data

Jun. 24, 2013 (JP) ................................. 2013-131663

(51) Int. Cl.
*G06F 1/32* (2006.01)

(52) U.S. Cl.
CPC ............ *G06F 1/324* (2013.01); *G06F 1/3209* (2013.01); *G06F 1/3284* (2013.01); *Y02B 60/1267* (2013.01)

(58) Field of Classification Search
CPC ....... G06F 1/3204; G06F 1/3284; G06F 1/329
USPC ......................................... 713/320, 321, 322
See application file for complete search history.

(56) References Cited

U.S. PATENT DOCUMENTS

| | | | | |
|---|---|---|---|---|
| 5,333,273 A * | 7/1994 | Raasch | ................. | G06F 13/24 708/139 |
| 7,443,862 B2 * | 10/2008 | Nishio | ............. | H04L 29/12018 370/389 |
| 7,453,823 B2 * | 11/2008 | Yoshida | ................ | H04W 72/12 370/252 |
| 8,126,149 B2 * | 2/2012 | Hara | ........................ | H04K 1/00 380/270 |
| 8,635,479 B2 * | 1/2014 | Soga | .................. | G03G 15/5004 713/320 |
| 2009/0164816 A1 * | 6/2009 | Yasuda | ................... | H04L 12/10 713/320 |

(Continued)

FOREIGN PATENT DOCUMENTS

JP 2009-151537 A 7/2009

OTHER PUBLICATIONS

Cheshire, et al., "Dynamic Configuration of IPv4 Link-Local Addresses", May 2005, pp. 1-33, Memo, Network Working Group, Request for Comments: 3927, Category: Standards Track, URL: <http://tools.ietf.org/html/rfc3927>, printed from the Internet Jun. 18, 2014.

*Primary Examiner* — Chun Cao
(74) *Attorney, Agent, or Firm* — Canon USA, Inc. IP Division

(57) ABSTRACT

When a printing apparatus operates in a normal power mode, a control unit specifies a time of receipt of a packet and a reception interval between packets by using an RTC. On the other hand, when the printing apparatus operates in a power-saving mode, a communication unit specifies a time of receipt of a packet and a reception interval between packets on the basis of time-of-day information acquired from an SNTP server.

3 Claims, 10 Drawing Sheets

(56) References Cited

U.S. PATENT DOCUMENTS

2012/0191989 A1\* 7/2012 Michishita ............ G06F 1/3209
    713/300
2013/0163616 A1\* 6/2013 Niitsuma ................ H04L 12/12
    370/468

\* cited by examiner

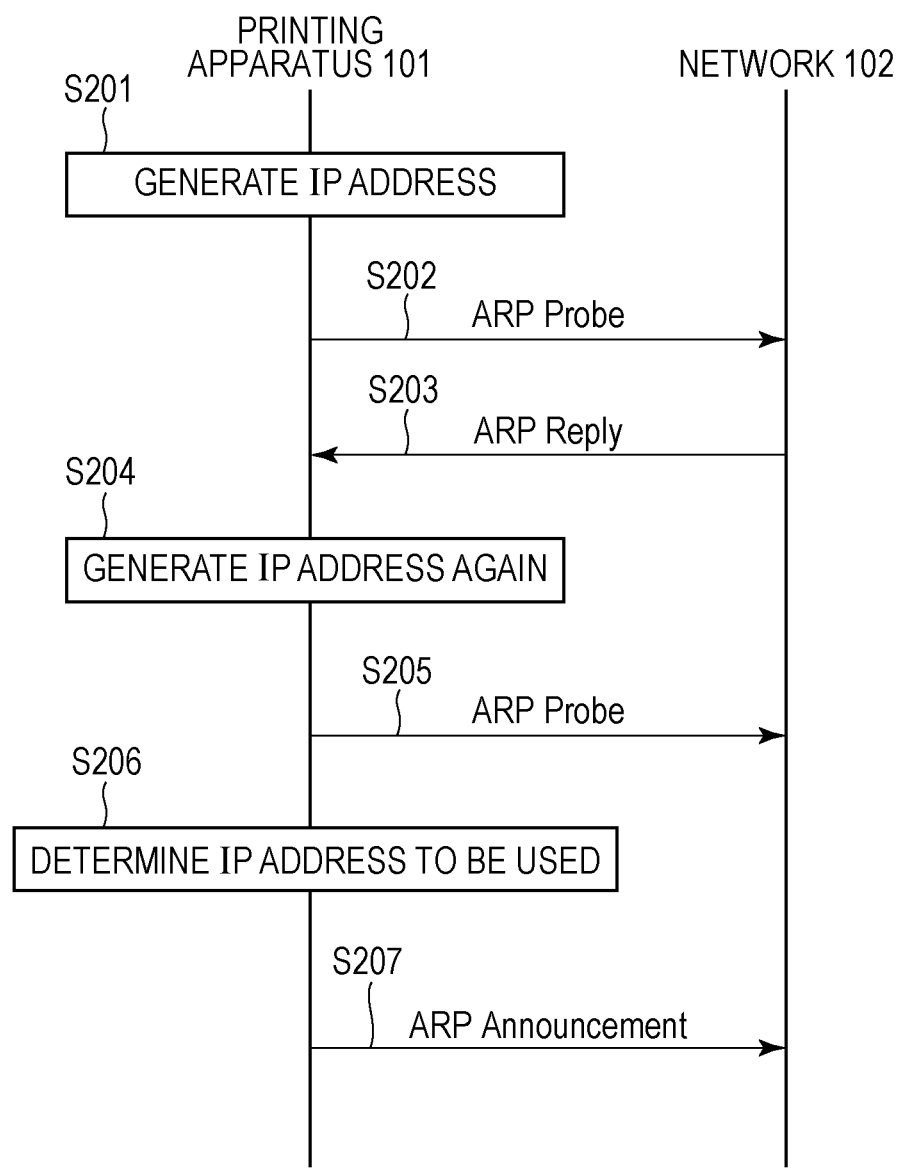

FIG. 3A

| FIELD | | BYTE LENGTH | |
|---|---|---|---|
| HARDWARE TYPE | | 2 | |
| PROTOCOL TYPE | | 2 | |
| HARDWARE ADDRESS LENGTH | PROTOCOL ADDRESS LENGTH | 1 | 1 |
| OPERATION | | 2 | |
| SOURCE HARDWARE ADDRESS | | 6 | |
| SOURCE PROTOCOL ADDRESS | | 4 | |
| DESTINATION HARDWARE ADDRESS | | 6 | |
| DESTINATION PROTOCOL ADDRESS | | 4 | |

FIG. 3B

| FIELD | VALUES TO BE SET |
|---|---|
| SOURCE HARDWARE ADDRESS | MAC ADDRESS OF ITSELF |
| SOURCE PROTOCOL ADDRESS | ALL VALUES OF 0 |
| DESTINATION HARDWARE ADDRESS | ALL VALUES OF 0 |
| DESTINATION PROTOCOL ADDRESS | GENERATED IP ADDRESS |

FIG. 3C

| FIELD | VALUES TO BE SET |
|---|---|
| SOURCE HARDWARE ADDRESS | MAC ADDRESS OF ITSELF |
| SOURCE PROTOCOL ADDRESS | DETERMINED IP ADDRESS |
| DESTINATION HARDWARE ADDRESS | ALL VALUES OF 0 |
| DESTINATION PROTOCOL ADDRESS | DETERMINED IP ADDRESS |

INFORMATION PROCESSING APPARATUS, CONTROL METHOD FOR INFORMATION PROCESSING APPARATUS, AND STORAGE MEDIUM FOR REDUCING POWER CONSUMPTION IN RESPONSE TO A TRANSITION

BACKGROUND OF THE INVENTION

Field of the Invention

The present invention relates to an information processing apparatus, a control method for the information processing apparatus, and a storage medium.

Description of the Related Art

In an information processing apparatus, such as a printer or digital multifunction apparatus, as a technique for reducing power consumption, for example, there is known a technique for causing the information processing apparatus to transition from a normal power mode to a power-saving mode when the information processing apparatus has not been operating for a predetermined time period. In the normal power mode, power is supplied to both a control unit and a communication unit that are included in the information processing apparatus. On the other hand, in the power-saving mode, the supply of power to the communication unit is continued, and the supply of power to the control unit is interrupted or reduced. Hence, the power-saving mode reduces power consumption of the entire information processing apparatus more than the normal power mode. Japanese Patent Laid-Open No. 2009-151537 discloses that a control unit responds to a reception packet received from an external apparatus when an information processing apparatus is in a normal power mode, and a communication unit responds to a reception packet instead of the control unit when the information processing apparatus is in a power-saving mode.

In the information processing apparatus, there is known a technique called automatic private IP addressing (AutoIP) suggested in request for comments (RFC) 3927. The use of the AutoIP enables the information processing apparatus itself to automatically determine an IP address to be set in itself without receiving an assignment of an IP address from a dynamic host configuration protocol (DHCP) server or the like. When the information processing apparatus generates an IP address to be set in the information processing apparatus on the basis of the AutoIP, the information processing apparatus checks whether or not the generated IP address has been used by another apparatus. When the IP address has not been used by another apparatus, the information processing apparatus determines to use the generated IP address as an IP address to be set in itself. Then, an address resolution protocol (ARP) packet called an ARP Announcement is broadcast, and the information processing apparatus thereby notifies other apparatuses of the IP address to be used by itself.

The AutoIP defines that, when the information processing apparatus receives an ARP Announcement with an IP address coinciding with the IP address of itself twice within ten seconds, the information processing apparatus determines an IP address to be set in itself again. This may prevent a plurality of apparatuses having the same IP address from existing in a network.

In the case of Japanese Patent Laid-Open No. 2009-151537, it has not been considered how the information processing apparatus operating in the power-saving mode adapts to the AutoIP.

SUMMARY OF THE INVENTION

The present invention provides an information processing apparatus adaptable to AutoIP even when the information processing apparatus is operating in a power-saving mode.

An information processing apparatus provided by the present invention includes: a processing unit configured to perform a determination process in which an IP address of the information processing apparatus is determined; a first specifying unit configured to specify a reception interval between packets involved in the determination process when the information processing apparatus operates in a first power mode; a second specifying unit configured to specify a reception interval between packets involved in the determination process when the information processing apparatus operates in a second power mode which is smaller than the first power mode in terms of power consumption; and an instructing unit configured to provide an instruction to cause the information processing apparatus to transition from the second power mode to the first power mode when a reception interval specified by the second specifying unit satisfies a predetermined condition. When a reception interval specified by the first specifying unit satisfies a predetermined condition, or when the information processing apparatus transitions from the second power mode to the first power mode in accordance with the instruction provided by the instructing unit, the processing unit performs the determination process.

Further features of the present invention will become apparent from the following description of exemplary embodiments with reference to the attached drawings.

BRIEF DESCRIPTION OF THE DRAWINGS

FIG. 2 illustrates a process based on AutoIP.

FIGS. 3A to 3C illustrate the process based on the AutoIP.

DESCRIPTION OF THE EMBODIMENTS

Exemplary embodiments for implementing the present invention will be described below with reference to the drawings. Note that the following embodiments are not intended to limit the invention according to the claims and all combinations of features to be described in the embodiments are not necessarily essential to the invention.

Embodiment

Figure 1:
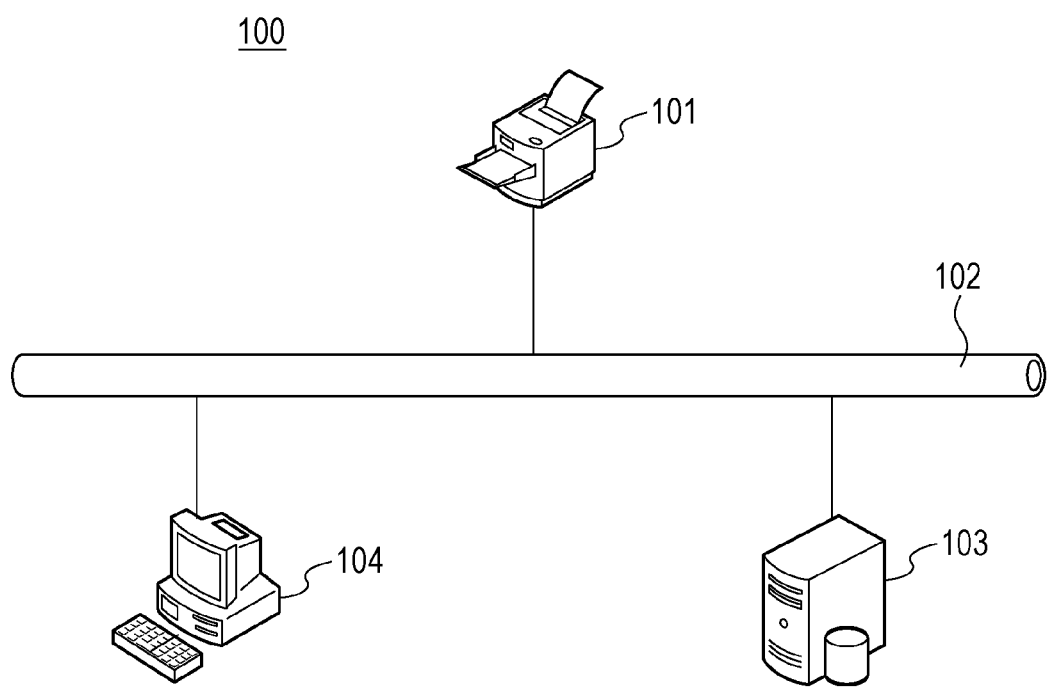
FIG. 1 illustrates the configuration of an information processing system.

The configuration of an information processing system 100 according to an embodiment will be described with reference to FIG. 1. The information processing system 100 includes a printing apparatus 101, a simple network time protocol (SNTP) server 103, and a personal computer (PC) 104, and these apparatuses are connected to each other via a network 102 in such a manner as to be able to communicate with each other. The PC 104 transmits a print job to the printing apparatus 101, and the printing apparatus 101 performs printing on the basis of the received print job. The printing apparatus 101 also acquires time-of-day information from the SNTP server 103 and specifies a time on the basis of the acquired time-of-day information.

Next, the mechanism of AutoIP will be described. First, an address determination process based on the AutoIP will be described with reference to FIGS. 2 and 3A to 3C. The mechanism of the AutoIP is defined in the RFC 3927.

When a power supply of the printing apparatus 101 is turned ON, the printing apparatus 101 generates an IP address in step S201. In the case of the AutoIP, the printing apparatus 101 generates a random IP address in a range from 169.254.1.0 to 169.254.254.255.

In step S201, since an IP address is generated at random, in some cases, the IP address coincides with an IP address of another apparatus. For this reason, after an IP address is generated, the printing apparatus 101 determines whether or not the IP address has already been used by another apparatus. Specifically, in step S202, the printing apparatus 101 broadcasts an ARP packet called an ARP Probe to the network 102. FIG. 3A illustrates the structure of an ARP packet. The ARP packet is defined in RFC 826. In the ARP Probe, predetermined fields of the ARP packet are set to values as in FIG. 3B.

When an apparatus whose IP address coincides with the IP address generated in step S201 exists among apparatuses on the network 102, the printing apparatus 101 receives an ARP Reply transmitted from the apparatus in step S203. The printing apparatus 101 having received the ARP Reply generates an IP address again in step S204, and broadcasts an ARP Probe to the network 102 in step S205. The printing apparatus 101 repeatedly generates an IP address and transmits an ARP Probe until it does not receive an ARP Reply.

When the printing apparatus 101 has not received an ARP Reply to the ARP Probe for a predetermined time period, the printing apparatus 101 determines to use the generated IP address as an IP address to be used by itself in step S206, and sets it in itself. When the IP address to be used by the printing apparatus 101 is determined, the printing apparatus 101 broadcasts an ARP Announcement to the network 102 in step S207. In the ARP Announcement, the fields of the ARP packet are set to values as in FIG. 3C. The ARP Announcement is used to notify other apparatuses of the IP address to be used by the printing apparatus 101.

As described above, the use of the AutoIP enables an IP address to be set in the printing apparatus 101 to be automatically determined and enables the determined IP address to be set in the printing apparatus 101.

The RFC 3927 defines that, when an information processing apparatus receives an ARP Announcement with an IP address coinciding with the IP address of itself twice within a predetermined time period (ten seconds), the information processing apparatus performs the address determination process illustrated in FIG. 2 again. This will be described with reference to FIG. 4.

Figure 4:
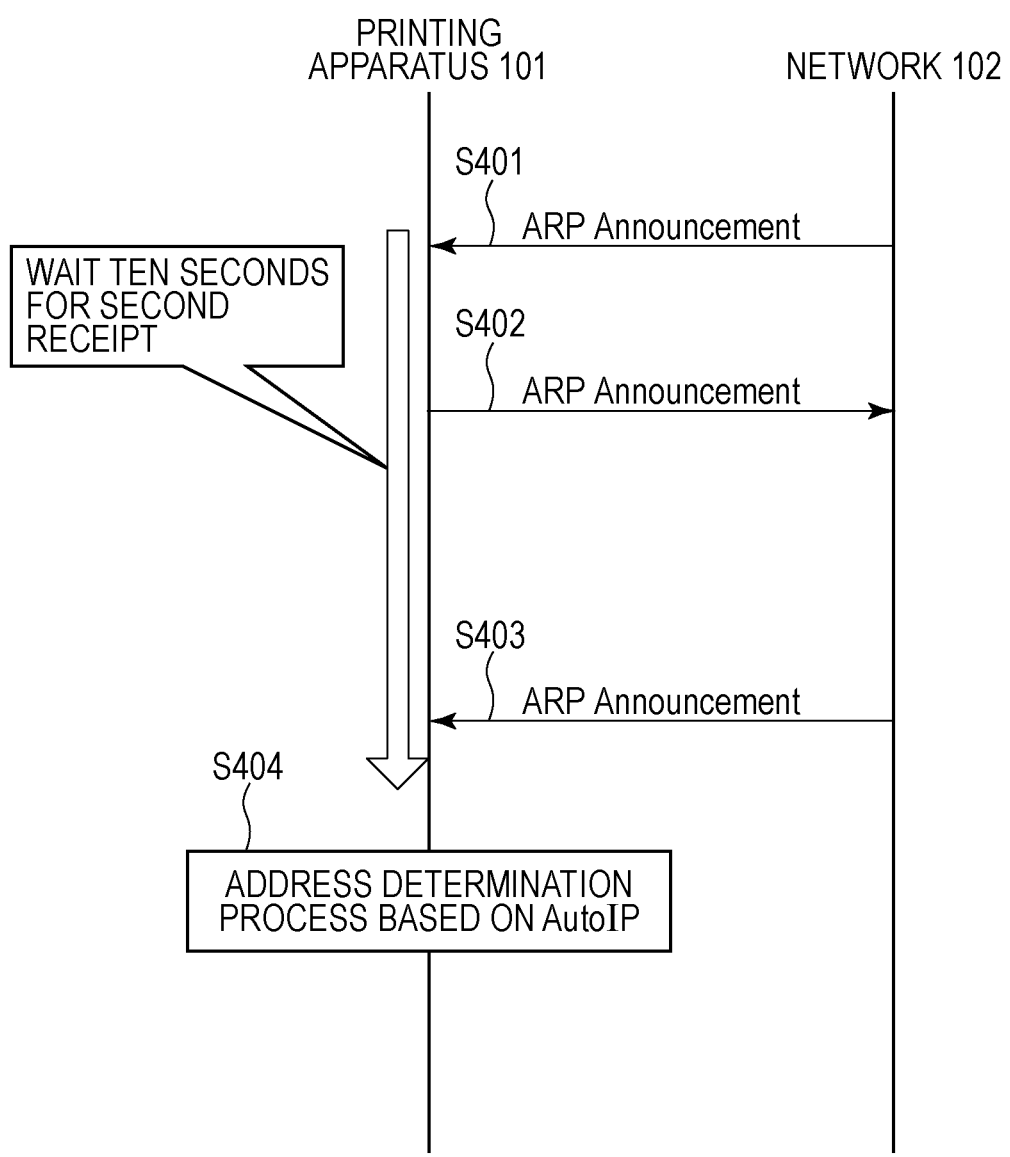
FIG. 4 illustrates a process based on the AutoIP.

In FIG. 4, the IP address of the printing apparatus 101 has been determined through the address determination process illustrated in FIG. 2. In step S401, the printing apparatus 101 receives an ARP Announcement transmitted from an apparatus on the network 102. Subsequently, the printing apparatus 101 determines whether or not an IP address set in a field "source protocol address" coincides with the IP address of itself. When the IP address does not coincide with the IP address of the printing apparatus 101, the printing apparatus 101 does not respond to the received ARP Announcement and ends the process. On the other hand, when the IP address coincides with the IP address of the printing apparatus 101, the printing apparatus 101 broadcasts an ARP Announcement in step S402.

When the printing apparatus 101 receives an ARP Announcement with an IP address coinciding with the IP address of itself twice within ten seconds, the printing apparatus 101 has to perform the address determination process illustrated in FIG. 2 again. FIG. 4 illustrates an example in which second receipt of an ARP Announcement with an IP address coinciding with the IP address of the printing apparatus 101 occurs (step S403) within ten seconds from first receipt of an ARP Announcement. When the second receipt of an ARP Announcement with an IP address coinciding with the IP address of the printing apparatus 101 occurs, the printing apparatus 101 performs the address determination process illustrated in FIG. 2 again in step S404. This may prevent a plurality of apparatuses whose IP addresses are the same from existing in the same network.

Figure 5:
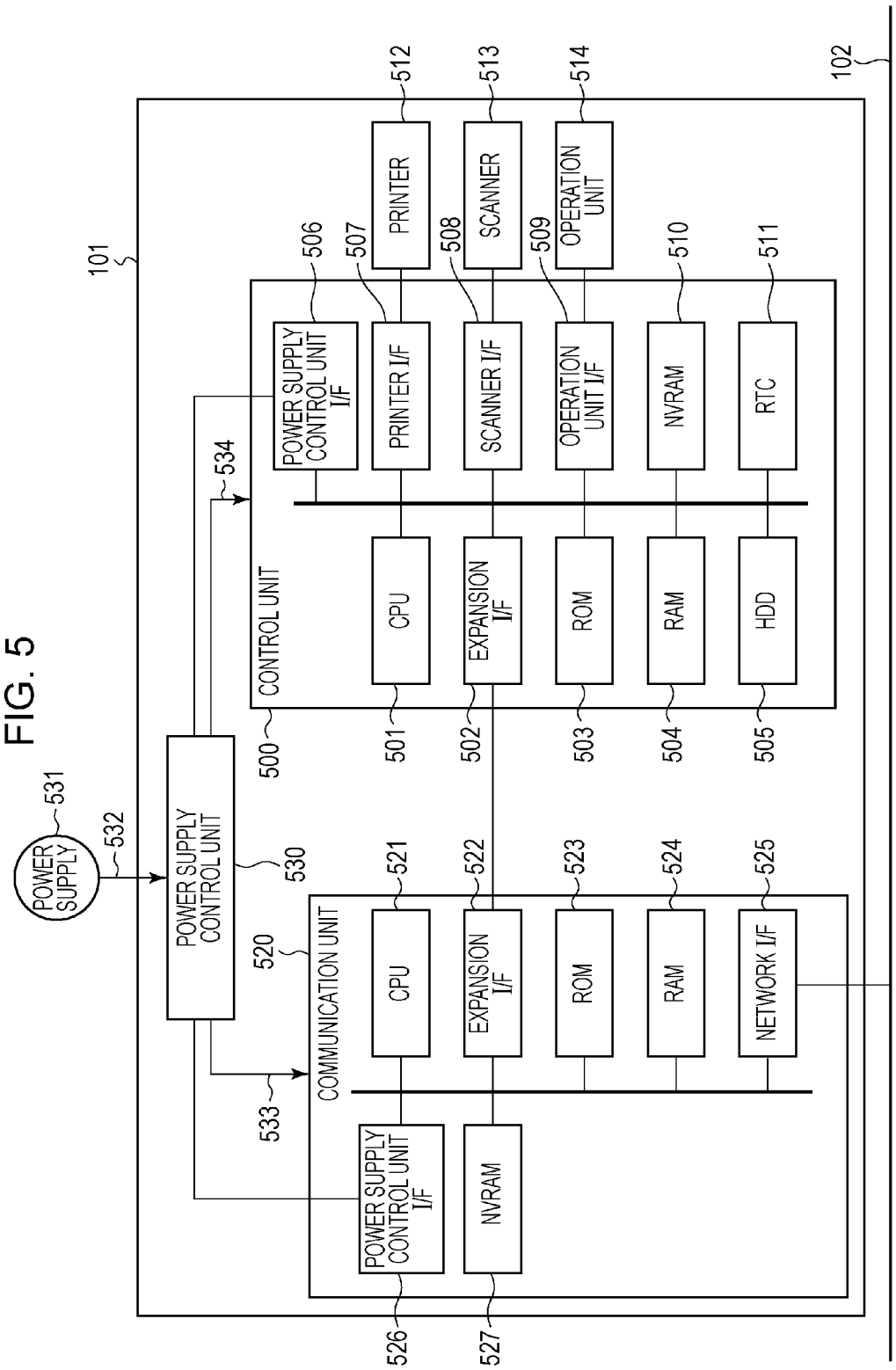
FIG. 5 illustrates the configuration of a printing apparatus.

Next, a hardware configuration of the printing apparatus 101 will be described with reference to FIG. 5. The printing apparatus 101 is a digital multifunction apparatus having a copy function, a print function, a scan function, a transmission function, and so forth, and is an example of an information processing apparatus. This embodiment will be described by taking, as an example, the digital multifunction apparatus; however, the printing apparatus 101 is not limited to the digital multifunction apparatus. The printing apparatus 101 does not have to have all the above-mentioned functions, and the printing apparatus 101 may have at least one function of the above-mentioned functions, or further have another function.

The printing apparatus 101 includes a control unit 500, a communication unit 520, a power supply control unit 530, a printer 512, a scanner 513, and an operation unit 514. The configuration of each unit will be described.

The control unit 500 including a central processing unit (CPU) 501 controls an operation performed by the entire printing apparatus 101. The CPU 501 reads a control program stored in a memory, such as a read only memory (ROM) 503, and controls an operation performed by the printing apparatus 101. A random access memory (RAM) 504 is used as a main memory of the CPU 501, and a temporary storage area, such as a work area. A hard disk drive (HDD) 505 is used as a storage area that stores various pieces of information, such as a control program, font data, and an emulation program. A non-volatile RAM (NVRAM) 510 is a nonvolatile memory, and stores various pieces of information. A real time clock (RTC) 511 measures a time. A battery, which is not illustrated, is connected to the RTC 511, and the RTC 511 continues to operate even when the power supply of the printing apparatus 101 is in an OFF state. An expansion interface (I/F) 502 communicates with the communication unit 520.

In the case of the control unit 500 of the printing apparatus 101, one CPU 501 executes processes illustrated in flowcharts to be described by using one memory (RAM 504 or HDD 505); however, the processes may be executed in another manner. For example, the processes illustrated in the flowcharts to be described may be executed by causing a plurality of CPUs and a plurality of RAMs or HDDs to work together.

A printer I/F 507 connects the control unit 500 and the printer 512. The printer 512 performs a printing process on a sheet on the basis of a print job, or image data generated by the scanner 513. Image data to be printed by the printer 512 is transferred from the control unit 500 to the printer 512 via the printer I/F 507.

A scanner I/F 508 connects the control unit 500 and the scanner 513. The scanner 513 reads a document and generates image data. The image data generated by the scanner 513 is transferred to the control unit 500 via the scanner I/F 508.

An operation unit I/F 509 connects the control unit 500 and the operation unit 514. The operation unit 514 includes a liquid crystal display having a touch panel function, a keyboard, and so forth. Information input by a user via the operation unit 514 is transferred to the control unit 500 via the operation unit I/F 509.

A power supply control unit I/F 506 connects the control unit 500 and the power supply control unit 530. A power mode transition instruction to be described is transferred from the control unit 500 to the power supply control unit 530 via the power supply control unit I/F 506.

Next, the communication unit 520 will be described. The communication unit 520 controls communication of the printing apparatus 101. The communication unit 520 is a network interface device (NIC), and is configured to be attachable and detachable to and from the printing apparatus 101. The control unit 500 is capable of communicating with an external apparatus, such as the PC 104, via the communication unit 520.

A CPU 521 reads a control program stored in a ROM 523 and controls an operation performed by the communication unit 520. A RAM 524 is used as a main memory of the CPU 521, and a temporary storage area, such as a work area. An NVRAM 527 is a nonvolatile memory, and stores various pieces of information. In the case of the communication unit 520 of the printing apparatus 101, one CPU 521 executes processes illustrated in flowcharts to be described by using one memory (RAM 524); however, the processes may be executed in another manner. For example, the processes illustrated in the flowcharts to be described may be executed by causing a plurality of CPUs and a plurality of RAMs to work together.

A network I/F 525 is connected to the network 102, and transmits and receives data to and from an external apparatus, such as the PC 104. An expansion I/F 522 communicates with the control unit 500.

A power supply control unit I/F 526 connects the communication unit 520 and the power supply control unit 530. A power mode transition instruction to be described is transferred from the communication unit 520 to the power supply control unit 530 via the power supply control unit I/F 526.

The power supply control unit 530 converts alternating-current power supplied from a power supply 531 via a power supply line 532 into direct-current power, and supplies the direct-current power to the communication unit 520 and the control unit 500 via power supply lines 533 and 534. In this embodiment, the power supply control unit 530 supplies direct-current power to the printer 512, the scanner 513, and the operation unit 514 via power supply lines, which are not illustrated. The power supply control unit 530 controls a power mode of the printing apparatus 101 on the basis of a transition instruction received from the power supply control unit I/F 506 or 526.

Next, power modes that the printing apparatus 101 has will be described. The printing apparatus 101 has two power modes: a normal power mode and a power-saving mode.

When the printing apparatus 101 operates in the normal power mode, power is supplied to both the control unit 500 and the communication unit 520 by the power supply control unit 530. At this time, power may be supplied to the printer 512, the scanner 513, and the operation unit 514 at all times; alternatively, when the printer 512, the scanner 513, or the operation unit 514 has not been used, the supply of power to a unit that is not being used may be interrupted. That is, the normal power mode is a power mode in which power is supplied to at least both the control unit 500 and the communication unit 520 by the power supply control unit 530.

On the other hand, when the printing apparatus 101 operates in the power-saving mode, power is supplied to the communication unit 520 by the power supply control unit 530; however, the supply of power to the control unit 500, the printer 512, the scanner 513, and the operation unit 514 is interrupted. Since the supply of power to the control unit 500, the printer 512, the scanner 513, and the operation unit 514 is interrupted, it could be said that the power-saving mode is a power mode which is smaller than the normal power mode in terms of power consumption.

When the printing apparatus 101 operates in the power-saving mode, the communication unit 520 performs a process for a packet transmitted from an external apparatus, such as the PC 104, on behalf of the control unit 500 (hereinafter, this function is referred to as a proxy response). At this time, the communication unit 520 determines a process for the received packet on the basis of a proxy response pattern and a wake on LAN (WOL) pattern. The proxy response pattern will be described in detail with reference to FIGS. 8 and 10 to be described.

As described with reference to FIG. 4, the printing apparatus 101 has to determine whether or not a reception interval between ARP Announcements is within ten seconds. Such reception intervals in the normal power mode and the power-saving mode are respectively measured in different manners. This will be described in detail with reference to flowcharts to be described; however, when the printing apparatus 101 operates in the normal power mode, the control unit 500 measures a reception interval by using the RTC 511. On the other hand, when the printing apparatus 101 operates in the power-saving mode, the communication unit 520 measures a reception interval on the basis of time-of-day information acquired from the SNTP server 103.

Figure 6:
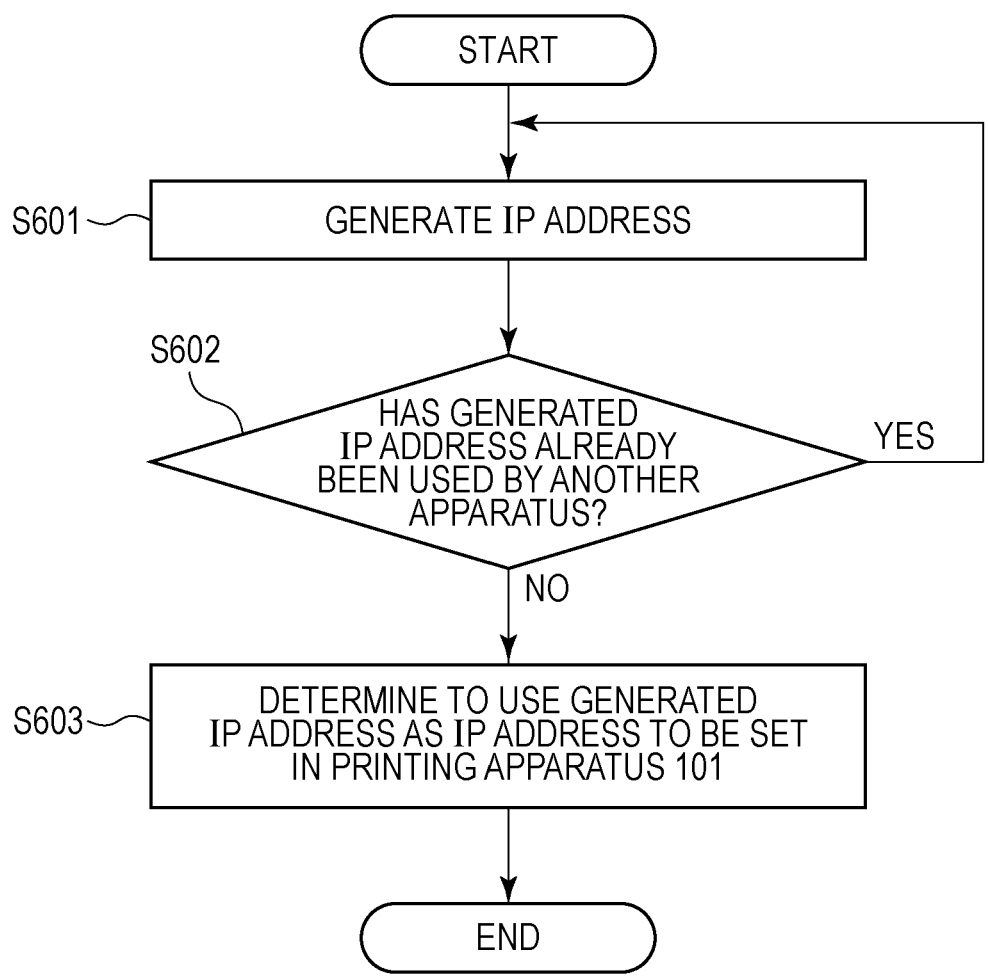
FIG. 6 is a flowchart illustrating an address determination process.

Next, an address determination process based on the AutoIP performed by the control unit 500 will be described with reference to a flowchart illustrated in FIG. 6. Steps illustrated in the flowchart in FIG. 6 are dealt with by the CPU 501 of the control unit 500 loading a program stored in a memory, such as the ROM 503, into the RAM 504 and executing it. A process of the flowchart in FIG. 6 is performed when the printing apparatus 101 operates in the normal power mode.

When the power supply of the printing apparatus 101 is turned ON, or when the printing apparatus 101 receives an ARP Announcement with an IP address coinciding with the IP address of itself twice within ten seconds, the CPU 501 generates an IP address in step S601. The CPU 501 generates a random IP address in a range from 169.254.1.0 to 169.254.254.255.

Subsequently, in step S602, the CPU 501 determines whether or not the IP address generated in step S601 has already been used by another apparatus. Specifically, an ARP Probe illustrated in FIG. 2 is broadcast via the communication unit 520 and it is determined whether or not an ARP Reply to the ARP Probe has been received for a predetermined time period. When the ARP Reply has not been received for the predetermined time period, it is determined that the IP address generated in step S601 has not been used by another apparatus, and the process flow proceeds to step S603. On the other hand, when the ARP Reply has been received, it is determined that the IP address generated in step S601 has already been used by another apparatus, the process flow returns to step S601, and an IP address is generated again.

Step S603 will be described. In step S603, the CPU 501 determines to use the IP address generated in step S601 as an IP address to be set in the printing apparatus 101. Then, the CPU 501 broadcasts an ARP Announcement illustrated in FIG. 2 via the communication unit 520, and notifies other apparatuses of the IP address to be used by the printing apparatus 101.

Figure 7:
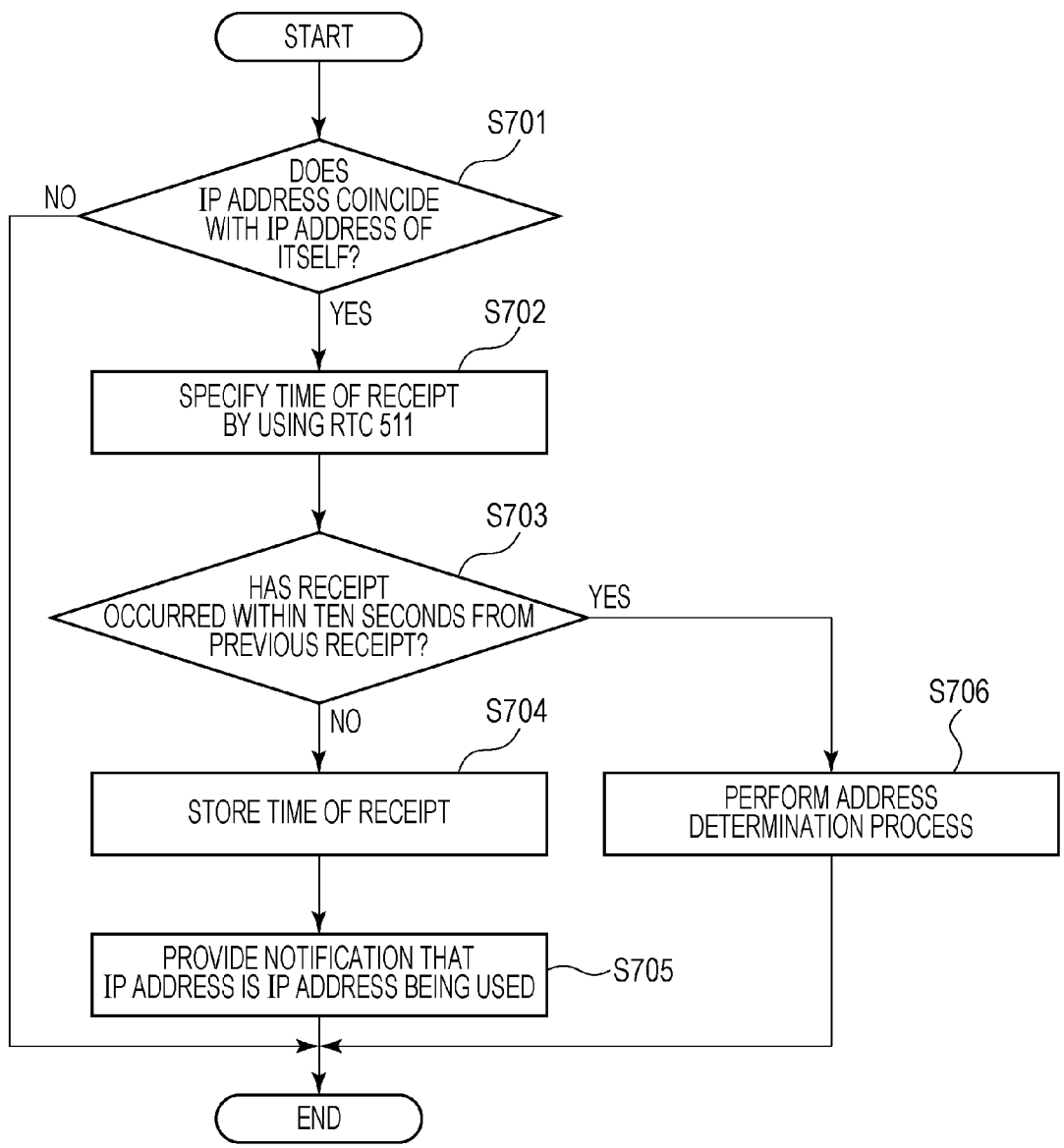
FIG. 7 is a flowchart illustrating a process performed when an ARP Announcement is received in a normal power mode.

Next, a process performed when the printing apparatus 101 operating in the normal power mode receives an ARP Announcement transmitted from an external apparatus on the network 102 will be described with reference to a flowchart illustrated in FIG. 7. Steps illustrated in the flowchart in FIG. 7 are dealt with by the CPU 501 of the control unit 500 loading a program stored in a memory, such as the ROM 503, into the RAM 504 and executing it.

When the control unit 500 receives an ARP Announcement via the communication unit 520, the CPU 501 determines whether or not an IP address set in a field "source protocol address" of the received ARP Announcement coincides with the IP address of the printing apparatus 101 in step S701. When the IP address does not coincide with the IP address of the printing apparatus 101, the received ARP Announcement is discarded, and the process illustrated in this flowchart ends. On the other hand, when the IP address coincides with the IP address of the printing apparatus 101, the process flow proceeds to step S702. In the following description, an ARP Announcement, an IP address set in the field "source protocol address" of which coincides with the IP address of the printing apparatus 101, is called a collision ARP Announcement so as to distinguish it from another ARP Announcement.

Step S702 will be described. In step S702, the CPU 501 specifies a time of receipt of the collision ARP Announcement by using the RTC 511. Subsequently, in step S703, the CPU 501 determines whether or not this collision ARP Announcement has been received within ten seconds from receipt of a previous collision ARP Announcement. In this embodiment, a time when a collision ARP Announcement has been received is stored in the NVRAM 510, which will be described in step S704. In step S703, a reception interval between collision ARP Announcements is specified by referring to times stored in this NVRAM 510. When the CPU 501 determines that this collision ARP Announcement has been received within ten seconds from receipt of a previous collision ARP Announcement in step S703, the process flow proceeds to step S706. On the other hand, when the CPU 501 determines that this collision ARP Announcement has not been received within ten seconds from receipt of a previous collision ARP Announcement in step S703, the process flow proceeds to step S704.

Step S704 will be described. In step S704, the CPU 501 stores the time of receipt of the collision ARP Announcement in the NVRAM 510. The time of receipt stored here is to be used in a determination in step S703 made when a subsequent collision ARP Announcement is received.

Subsequently, in step S705, the CPU 501 notifies the external apparatus that the IP address indicated in the received ARP Announcement (the IP address set in the field "source protocol address") is the IP address being used. Specifically, the CPU 501 broadcasts an ARP Announcement via the communication unit 520.

Step S706 will be described. In step S706, the CPU 501 performs an address determination process so as to again determine an IP address to be set in the printing apparatus 101. The reason why the address determination process is performed in step S706 is because a collision ARP Announcement has been received twice within ten seconds. The address determination process in step S706 is similar to the process illustrated in FIG. 6, and the description thereof is omitted here.

The processes performed when the printing apparatus 101 operates in the normal power mode are described with reference to FIGS. 6 and 7. The printing apparatus 101 operates in the power-saving mode in addition to the normal power mode. Processes performed in this power-saving mode will be described with reference to FIGS. 8 to 10.

Figure 8:
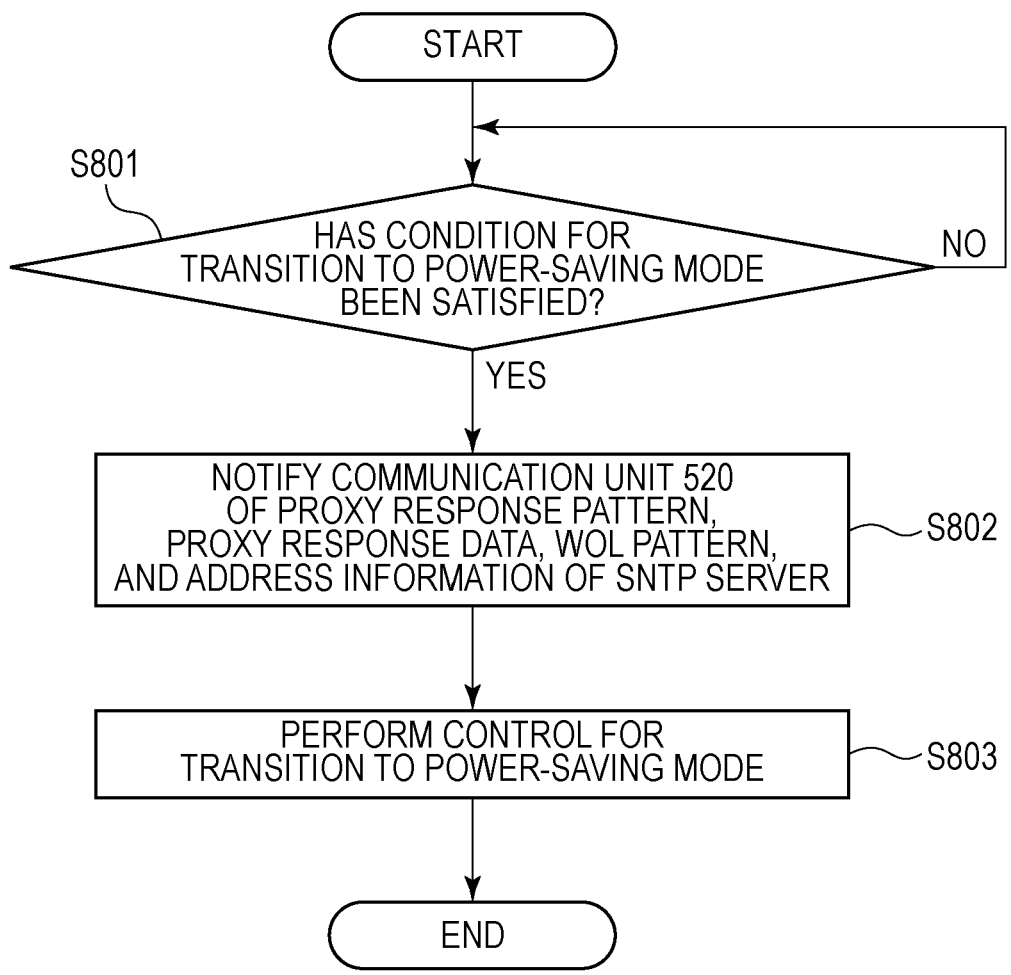
FIG. 8 is a flowchart illustrating a process for transition to a power-saving mode.

FIG. 8 illustrates a process performed when the printing apparatus 101 transitions from the normal power mode to the power-saving mode. Steps illustrated in a flowchart in FIG. 8 are dealt with by the CPU 501 of the control unit 500 loading a program stored in a memory, such as the ROM 503, into the RAM 504 and executing it.

In step S801, the CPU 501 determines whether or not a condition for transition to the power-saving mode has been satisfied. In this embodiment, for example, when a print job has not been input to the printing apparatus 101 for a predetermined time period (for example, five minutes), or when a transition instruction for transition to the power-saving mode is input from the user via the operation unit 514, the CPU 501 determines that the condition for transition to the power-saving mode has been satisfied, and the process flow proceeds to step S802. On the other hand, when the CPU 501 determines that the condition for transition to the power-saving mode has not been satisfied, the printing apparatus 101 waits until the condition for transition to the power-saving mode is satisfied.

Subsequently, in step S802, the CPU 501 notifies, via the expansion I/F 502, the communication unit 520 of a proxy response pattern, proxy response data, a WOL pattern, and address information of an SNTP server that are stored in a memory, such as the HDD 505. The communication unit 520 having received the notification provided in step S802 stores the provided information in the NVRAM 527.

The proxy response pattern represents a pattern of a packet to which the communication unit 520 responds instead of the control unit 500 when the printing apparatus 101 operates in the power-saving mode. For example, the proxy response pattern represents a status request of the printing apparatus 101 or a request for a remaining amount of sheets. The proxy response data is response data corresponding to the proxy response pattern. The WOL pattern represents a pattern of a packet which involves transition of the printing apparatus 101 from the power-saving mode to the normal power mode. For example, the WOL pattern represents a print job. The address information of an SNTP server is information preset in the printing apparatus 101 by the user via a settings screen, which is not illustrated. For example, the address information of an SNTP server represents the SNTP server 103. In order to specify a time of receipt of a packet and a reception interval between packets, the communication unit 520 uses an SNTP server represented by the address information.

Step S803 will be described. In step S803, the CPU 501 performs control so that the printing apparatus 101 transitions from the normal power mode to the power-saving mode. Specifically, the CPU 501 notifies, via the power supply control unit I/F 506, the power supply control unit 530 of a transition instruction for transition from the normal power mode to the power-saving mode. Then, the supply of power to the control unit 500 is interrupted by the power supply control unit 530 having received the notification, and thus the printing apparatus 101 transitions from the normal power mode to the power-saving mode.

In the above description made with reference to FIG. 8, upon transition from the normal power mode to the power-saving mode, the communication unit 520 is notified of a proxy response pattern, proxy response data, a WOL pattern, and address information of an SNTP server; however, a point in time when this notification is provided may be another point in time. For example, when the printing apparatus 101 is activated, the communication unit 520 may be notified of a proxy response pattern, proxy response data, a WOL pattern, and address information of an SNTP server.

Figure 9:
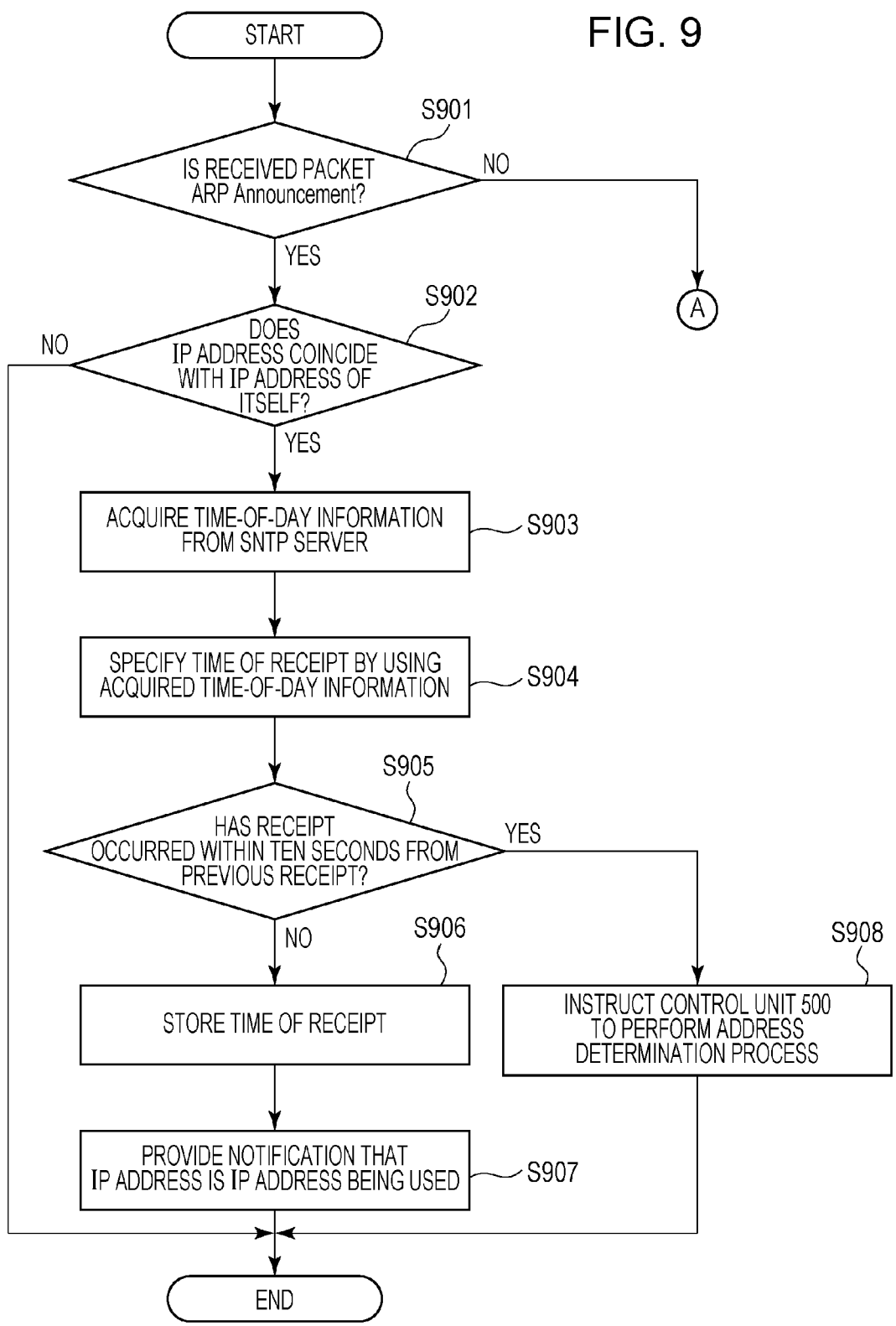
FIG. 9 is a flowchart illustrating a process performed when a packet is received in the power-saving mode.
Figure 10:
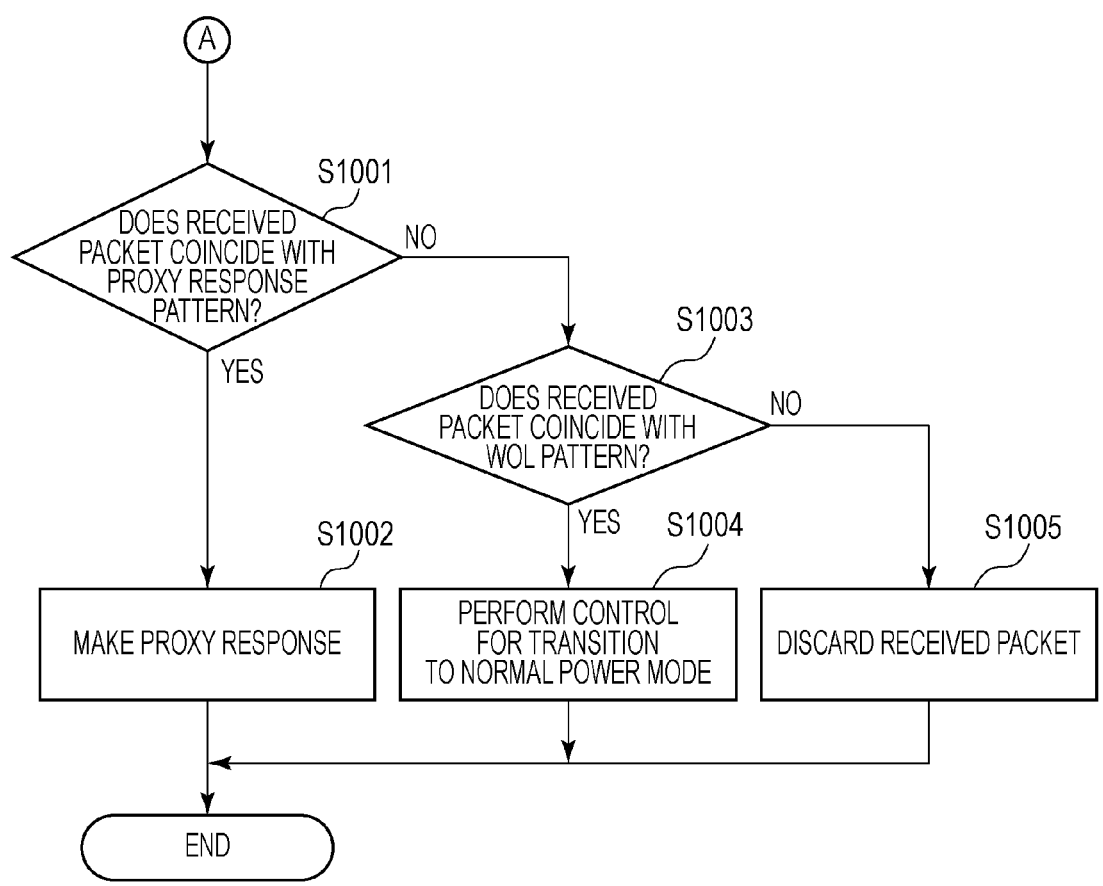
FIG. 10 is a flowchart illustrating a process performed when the packet is received in the power-saving mode.

Next, a process performed when the printing apparatus 101 operating in the power-saving mode receives a packet transmitted from an external apparatus on the network 102 will be described with reference to flowcharts illustrated in FIGS. 9 and 10. Steps illustrated in the flowcharts in FIGS. 9 and 10 are dealt with by the CPU 521 of the communication unit 520 loading a program stored in a memory, such as the ROM 523, into the RAM 524 and executing it.

When a packet transmitted from an external apparatus on the network 102 is received, the CPU 521 of the communication unit 520 determines whether or not the received packet is an ARP Announcement in step S901. When the CPU 521 determines that the received packet is an ARP Announcement, the process flow proceeds to step S902. On the other hand, when the CPU 521 determines that the received packet is not an ARP Announcement, the process flow proceeds to step S1001 in FIG. 10. The flowchart in FIG. 10 will be described later.

Step S902 will be described. In step S902, the CPU 521 determines whether or not an IP address set in a field "source protocol address" of the ARP Announcement coincides with the IP address of the printing apparatus 101. When the IP address does not coincide with the IP address of the printing apparatus 101, the received ARP Announcement is discarded, and the process illustrated in this flowchart ends. On the other hand, when the IP address coincides with the IP address of the printing apparatus 101, the process flow proceeds to step S903.

Step S903 will be described. In step S903, the CPU 521 acquires, via the network I/F 525, time-of-day information from the SNTP server 103 represented by address information (address information provided from the control unit 500). Then, in step S904, the CPU 521 specifies a time of receipt of the collision ARP Announcement on the basis of the acquired time-of-day information. When the printing apparatus 101 operates in the power-saving mode, the CPU 521 of the communication unit 520 is not able to use the RTC 511. For this reason, in this embodiment, time-of-day information is acquired from an external time server (SNTP server 103), and a time of receipt of a collision ARP Announcement and a reception interval between collision ARP Announcements are thereby specified.

In step S905, the CPU 521 determines whether or not this collision ARP Announcement has been received within ten seconds from receipt of a previous collision ARP Announcement. In this embodiment, a time when a collision ARP Announcement has been received is stored in the NVRAM 527, which will be described in step S906. In step S905, a reception interval between collision ARP Announcements is specified by referring to times stored in this NVRAM 527. When the CPU 521 determines that this collision ARP Announcement has been received within ten seconds from receipt of a previous collision ARP Announcement in step S905, the process flow proceeds to step S908. On the other hand, when the CPU 521 determines that this collision ARP Announcement has not been received within ten seconds from receipt of a previous collision ARP Announcement in step S905, the process flow proceeds to step S906.

Step S906 will be described. In step S906, the CPU 521 stores the time of receipt of the collision ARP Announcement in the NVRAM 527. The time of receipt stored here is to be used in a determination in step S905 made when a subsequent collision ARP Announcement is received.

Subsequently, in step S907, the CPU 521 notifies the external apparatus that the IP address indicated in the received ARP Announcement (the IP address set in the field "source protocol address") is the IP address being used. Specifically, the CPU 521 broadcasts an ARP Announcement via the network I/F 525.

Step S908 will be described. In step S908, the CPU 521 instructs, via the expansion I/F 522, the control unit 500 to perform an address determination process. Specifically, the CPU 521 notifies, via the power supply control unit I/F 526, the power supply control unit 530 of a transition instruction for transition from the power-saving mode to the normal power mode. Then, the supply of power to the control unit 500 is resumed by the power supply control unit 530 having received the notification, and thus the printing apparatus 101 transitions from the power-saving mode to the normal power mode. When the printing apparatus 101 transitions to the normal power mode, the CPU 521 instructs, via the expansion I/F 522, the control unit 500 to perform the address determination process. The CPU 501 of the control unit 500 having received the instruction performs the address determination process so as to again determine an IP address to be set in the printing apparatus 101. The address determination process is similar to the process illustrated in FIG. 6, and the description thereof is omitted here. The reason why the instruction to perform the address determination process is provided in step S908 is because a collision ARP Announcement has been received twice within ten seconds.

Step S1001 will be described. In step S1001, the CPU 521 determines whether or not the received packet coincides with a proxy response pattern. When the CPU 521 determines that the received packet does not coincide with a proxy response pattern, the process flow proceeds to step S1003.

On the other hand, when the CPU 521 determines that the received packet coincides with a proxy response pattern, the process flow proceeds to step S1002. Then, in step S1002, the CPU 521 makes a proxy response. Specifically, the CPU 521 transmits response data corresponding to the proxy response pattern to the external apparatus, which is a source of the packet, via the network I/F 525. In this embodiment, an ARP Probe also coincides with a proxy response pattern. When an IP address indicated in the ARP Probe (an IP address set in a field "destination protocol address") coincides with the IP address of the printing apparatus 101, the CPU 521 transmits response data (an ARP Reply) via the network I/F 525.

In step S1003, the CPU 521 determines whether or not the received packet coincides with a WOL pattern. When the CPU 521 determines that the received packet coincides with a WOL pattern, the process flow proceeds to step S1004. On the other hand, when the CPU 521 determines that the received packet does not coincide with a WOL pattern, the process flow proceeds to step S1005. Then, in step S1005, the CPU 521 discards the received packet.

Step S1004 will be described. In step S1004, the CPU 521 performs control so that the printing apparatus 101 transitions from the power-saving mode to the normal power mode. Specifically, the CPU 521 notifies, via the power supply control unit I/F 526, the power supply control unit 530 of a transition instruction for transition from the power-saving mode to the normal power mode. Then, the supply of power to the control unit 500 is resumed by the power supply control unit 530 having received the notification, and thus the printing apparatus 101 transitions from the power-saving mode to the normal power mode. When the printing apparatus 101 transitions from the power-saving mode to the normal power mode, the CPU 521 transfers the received packet to the control unit 500 via the expansion I/F 522. Then, the control unit 500 performs a process (for example, printing) corresponding to the received packet.

As described above, according to this embodiment, when the printing apparatus 101 operates in a normal power mode (an operating mode in which an RTC is usable), the control unit 500 may specify a time of receipt of a packet and a reception interval between packets by using the RTC 511. On the other hand, when the printing apparatus 101 operates in a power-saving mode (an operating mode in which an RTC is not usable), the communication unit 520 may specify a time of receipt of a packet and a reception interval between packets on the basis of time-of-day information acquired from an SNTP server.

Also, when the printing apparatus 101 operates in the power-saving mode, the communication unit 520 may specify a time of receipt of a packet and a reception interval between packets by counting clocks of the CPU 521. Furthermore, because the RTC 511 is operating even when the printing apparatus 101 operates in the power-saving mode, the communication unit 520 may specify a time of receipt of a packet and a reception interval between packets by the CPU 521 referring to the RTC 511.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention may also be implemented by executing the following process: software (a program) that implements the functions of the above-described embodiments is supplied to a system or apparatus via a network or various storage media, and a computer (CPU, MPU, or the like) in the system or apparatus reads and executes the program.

According to the present invention, when an information processing apparatus is in a specific operating mode, a reception interval between packets and a time of receipt of a packet may be specified on the basis of time-of-day information acquired from a time server on a network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131663, filed Jun. 24, 2013, which is hereby incorporated by reference herein in its entirety.

What is claimed is:

1. A printing apparatus comprising:
   a controller; and
   a network interface device,
   wherein the network interface device comprises:
   a memory that stores instructions; and
   a processor that executes the instructions to:
   specify a reception interval between a reception of a first address resolution protocol (ARP) announcement in which an internet protocol (IP) address of the printing apparatus is assigned and a reception of a second ARP announcement in which the IP address of the printing apparatus is assigned, in a case where the printing apparatus operates in a power-saving mode where power is supplied to the network interface device and not supplied to the controller; and
   cause the printing apparatus to transition to a normal power mode where power is supplied to the network interface device and the controller, in a case where the specified reception interval is within a predetermined time period,
   wherein, in response to the transition of the printing apparatus to the normal power mode, the controller determines an IP address of the printing apparatus in accordance with AutoIP, and
   wherein the network interface device is connected to a network, and the controller communicates with an external apparatus on the network via the network interface device.

2. A control method for a printing apparatus including a controller and a network interface device, the control method comprising:
   specifying a reception interval between a reception of a first ARP announcement in which an IP address of the printing apparatus is assigned and a reception of a second ARP announcement in which the IP address of the printing apparatus is assigned, in a case where the printing apparatus operates in a power-saving mode where power is supplied to the network interface device and not supplied to the controller; and
   causing the printing apparatus to transition to a normal power mode where power is supplied to the network interface device and the controller, in a case where the specified reception interval is within a predetermined time period,
   wherein, in response to the transition of the printing apparatus to the normal power mode, the controller determines an IP address of the printing apparatus in accordance with AutoIP, and wherein the network interface device is connected to a network, and the controller communicates with an external apparatus on the network via the network interface device.

3. A storage medium storing a program for causing a computer to execute a control method for a printing apparatus including a controller and a network interface device, the method comprising:

specifying a reception interval between a reception of a first ARP announcement in which an IP address of the printing apparatus is assigned and a reception of a second ARP announcement in which the IP address of the printing apparatus is assigned, in a case where the printing apparatus operates in a power-saving mode where power is supplied to the network interface device and not supplied to the controller; and causing the printing apparatus to transition to a normal power mode where power is supplied to the network interface device and the controller, in a case where the specified reception interval is within a predetermined time period, wherein, in response to the transition of the printing apparatus to the normal power mode, the controller determines an IP address of the printing apparatus in accordance with AutoIP, and wherein the network interface device is connected to a network, and the controller communicates with an external apparatus on the network via the network interface device.

\* \* \* \* \*